K. P. GRANT.
Weeder.
No. 208,084. Patented Sept. 17, 1878.
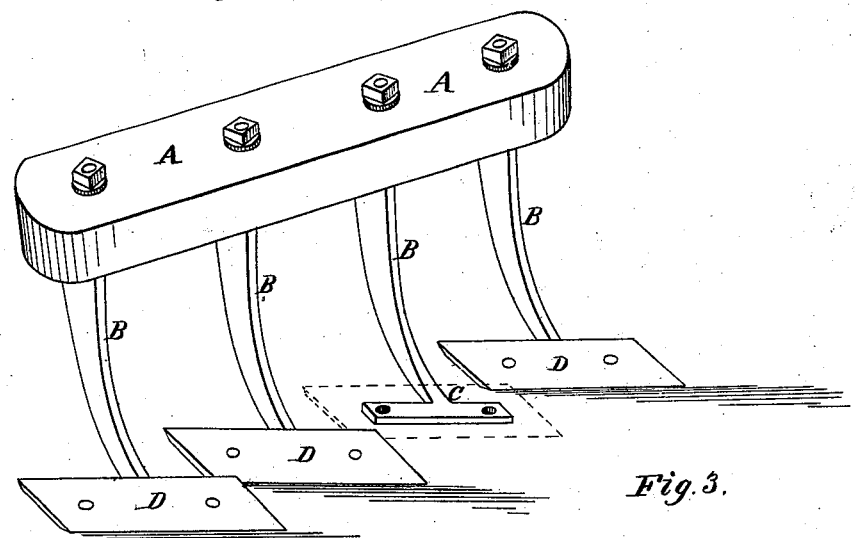
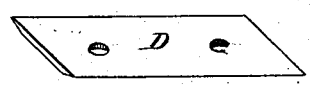
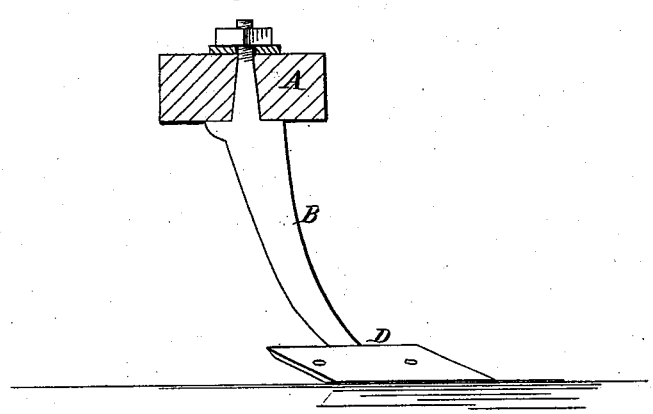
WITNESSES:
Henry N. Miller
C. Sedgwick
INVENTOR:
K. P. Grant
BY Munn & Co.
ATTORNEYS.

UNITED STATES PATENT OFFICE.

KENNETH P. GRANT, OF SAN BUENAVENTURA, CALIFORNIA.

IMPROVEMENT IN WEEDERS.

Specification forming part of Letters Patent No. 208,084, dated September 17, 1878; application filed June 17, 1878.

*To all whom it may concern:*

Be it known that I, KENNETH P. GRANT, of San Buenaventura, in the county of Ventura and State of California, have invented a new and useful Improvement in Weeders, of which the following is a specification:

Figure 1 is a perspective view of my improved device. Fig. 2 is a side view of the same, the beam being shown in cross-section. Fig. 3 is a detail perspective view of one of the knives.

Similar letters of reference indicate corresponding parts.

The object of this invention is to furnish an improved weeder which is designed to be attached to the frame of a gang-plow or cultivator, and which shall be so constructed as to cut off and destroy the weeds without turning the soil, and which at the same time shall be simple in construction, strong, and durable.

A represents a beam, which may be the bar of the frame-work of a gang-plow or cultivator or a beam to be attached to said frame-work.

B are the standards, the upper ends of which or bolts formed upon said upper ends pass through the beam A, and are secured by nuts screwed upon them. The lower parts of the standards B are inclined or curved forward, and upon their lower ends are formed cross-heads or T-feet C, to serve as seats for the knives or cutters D.

The T-feet C have holes formed through them near their ends, to receive the bolts by which the knives D are secured to them. The knives D have both their side edges beveled, so that either edge may be used forward, as may be desired.

This construction enables the knives C, when one edge becomes worn or dull, to be reversed and the other edge used, making the cutters much more durable and effective. With this construction the cutters are brought into a slightly-inclined position when at work, so as to cut off the weeds beneath the surface of the ground, and thus destroy them without turning the soil, leaving it smooth and light.

This invention renders it unnecessary for farmers to plow their lands two or three times to destroy the weeds, as the weeds can be destroyed much quicker and more effectively by the use of this implement.

The implement may be used for destroying the weeds between rows of plants as well as upon unplanted ground.

Having thus described my invention, I claim as new and desire to secure by Letters Patent—

In a weeder, the beam A, curved standard B, having T-feet C, and the inclined overlapping reversible blades D, constructed and arranged substantially as shown and described.

KENNETH PETER GRANT.

Witnesses:
 HENRY ROBINSON,
 JOHN S. NANCE.